United States Patent
Nakamura et al.

(10) Patent No.: US 7,859,704 B2
(45) Date of Patent: Dec. 28, 2010

(54) IMAGE FORMING APPARATUS INCLUDING A STORABLE PAGE NUMBER CALCULATING UNIT

(75) Inventors: Rie Nakamura, Kanagawa (JP); Tetsuo Asakawa, Tokyo (JP); Miki Kouchi, Kanagawa (JP); Akihiro Kakoi, Kanagawa (JP); Yoshinori Furuichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1015 days.

(21) Appl. No.: 11/624,501

(22) Filed: Jan. 18, 2007

(65) Prior Publication Data

US 2007/0188834 A1 Aug. 16, 2007

(30) Foreign Application Priority Data

Feb. 15, 2006 (JP) ............... 2006-038540

(51) Int. Cl.
*G06K 15/00* (2006.01)
(52) U.S. Cl. .............. 358/1.16; 358/1.1; 358/1.12; 358/1.13; 358/1.17; 358/500; 358/501; 358/527; 358/528; 358/400; 358/401; 358/404; 358/443; 358/444; 358/448; 358/449; 358/471; 358/474; 358/488; 358/494; 358/496; 358/497; 358/498
(58) Field of Classification Search .............. 358/1.16, 358/1.1, 1.12, 1.13, 1.17, 500, 501, 527, 358/528, 400, 401, 404, 443, 444, 448, 449, 358/471, 474, 488, 494, 496, 497, 498
See application file for complete search history.

(56) References Cited

U.S. PATENT DOCUMENTS

| | | | | |
|---|---|---|---|---|
| 4,647,188 | A * | 3/1987 | Komiya et al. ............. 355/55 |
| 5,369,505 | A * | 11/1994 | Wantanabe et al. ......... 358/444 |
| 6,304,342 | B1 * | 10/2001 | Komada .................... 358/448 |
| 2004/0107854 | A1 * | 6/2004 | Nakatani et al. ........... 101/484 |
| 2005/0134941 | A1 * | 6/2005 | Fukuda et al. ............. 358/474 |
| 2005/0193236 | A1 * | 9/2005 | Stager et al. ................ 714/6 |

FOREIGN PATENT DOCUMENTS

| | | | |
|---|---|---|---|
| JP | 5-37747 | | 2/1993 |
| JP | 05037747 A | * | 2/1993 |
| JP | 7-307848 | | 11/1995 |

OTHER PUBLICATIONS

U.S. Appl. No. 11/759,017, filed Jun. 6, 2007, Asakawa, et al.

* cited by examiner

*Primary Examiner*—King Y Poon
*Assistant Examiner*—Kenneth Kwan
(74) *Attorney, Agent, or Firm*—Oblon, Spivak, McClelland, Maier & Neustadt, L.L.P.

(57) ABSTRACT

In a disclosed image forming apparatus, an original is scanned and image data of the original are obtained. The data size of the image data corresponding to one page of the original is measured. The image data obtained are stored in or deleted from a memory. A storable number of pages of the original that can be stored in the memory is calculated based on the data size measured and available space in the memory. In response to the storable number of pages calculated being less than a total number of pages of the original, the image data of the original is successively stored in and deleted from the memory.

7 Claims, 9 Drawing Sheets

IMAGE FORMING APPARATUS INCLUDING A STORABLE PAGE NUMBER CALCULATING UNIT

BACKGROUND OF THE INVENTION

1. Field of the Invention

The present invention relates to an image forming apparatus, a program product, and a storage medium storing the program product for electronic sort printing all pages of an original at once or by plural portions, even when the total data size of the original exceeds the available space in a memory.

2. Description of the Related Art

An important function of image forming apparatuses equipped with a scanner function, such as PPCs (Plain Paper Copiers), is to scan an original document and perform electronic sort printing.

To perform electronic sort printing, the original is scanned by the scanner function, and image data obtained by scanning the original need to be loaded (hereinafter referred to as "stored") in a storage device such as a memory. However, the storage device provided in the image forming apparatus may not always be capable of storing the image data corresponding to all pages of the original.

This is because the size of the image data obtained is significantly affected by scanning conditions when scanning the original (conditions such as paper size, color mode, and resolution). Further, the available space in the storage device is significantly affected by the operational status of the image forming apparatus.

Therefore, even when all pages of an original are scanned, the image forming apparatus may not be able to print them out.

To address this problem, several methods have been proposed. When it is determined that electronic sort printing cannot be performed, the image data obtained are compressed or converted from multiple-valued data to binary data. Another method is to detect the width of the scanned original, calculate the data size of all pages of the original based on the detected width, and to secure a space in the storage device corresponding to the calculated data size (see, for example, Patent Documents 1 and 2).

Patent Document 1: Japanese Laid-Open Patent Application No. H5-37747

Patent Document 2: Japanese Laid-Open Patent Application No. H7-307848

With the method disclosed in Patent Document 1, the number of pages to be electronic sort printed can be increased. However, there still remains the possibility that the storage device cannot store data corresponding to all pages of the original. Accordingly, the user's request might not be fulfilled. Moreover, when the image data are converted from multiple-valued data to binary data, printing quality is degraded.

In the method disclosed in Patent Document 2, it may not be possible to secure space in the storage device large enough to store the image data. Accordingly, the user's request might not be fulfilled.

SUMMARY OF THE INVENTION

The present invention provides an image forming apparatus, a program product, and a storage medium storing the program product in which one or more of the above-described disadvantages are eliminated.

A preferred embodiment of the present invention provides an image forming apparatus, a program product, and a storage medium storing the program product for electronic sort printing all pages of an original at once or by plural portions, even when the total data size of the original exceeds the available space in a memory.

An embodiment of the present invention provides an image forming apparatus including an image scanning unit configured to scan an original and obtain image data of the original; an image data size measuring unit configured to measure a data size of the image data corresponding to one page of the original scanned by the image scanning unit; an image data storing unit configured to store in a memory the image data obtained by the image scanning unit; and a storable page number calculating unit configured to calculate a storable number of pages of the original that can be stored in the memory based on the data size measured by the image data size measuring unit and available space in the memory; wherein in response to the storable number of pages calculated by the storable page number calculating unit being less than a total number of pages of the original, the image data of the original is successively stored in and deleted from the memory.

An embodiment of the present invention provides a program product that causes a computer to execute a procedure for forming an image, the procedure including the steps of (a) scanning an original and obtaining image data of the original; (b) measuring a data size of the image data corresponding to one page of the original scanned at step (a); (c) storing in a memory the image data obtained at step (a); (d) deleting the image data stored in the memory at step (c); and (e) calculating a storable number of pages of the original that can be stored in the memory based on the data size measured at step (b) and available space in the memory; wherein in response to the storable number of pages calculated at step (e) being less than a total number of pages of the original, step (c) and step (d) are repeated.

According to one embodiment of the present invention, an image forming apparatus, a program product, and a storage medium storing the program product are provided for electronic sort printing all pages of an original at once or by plural portions, even when the total data size of the original exceeds the available space in a memory.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

Figure 1:
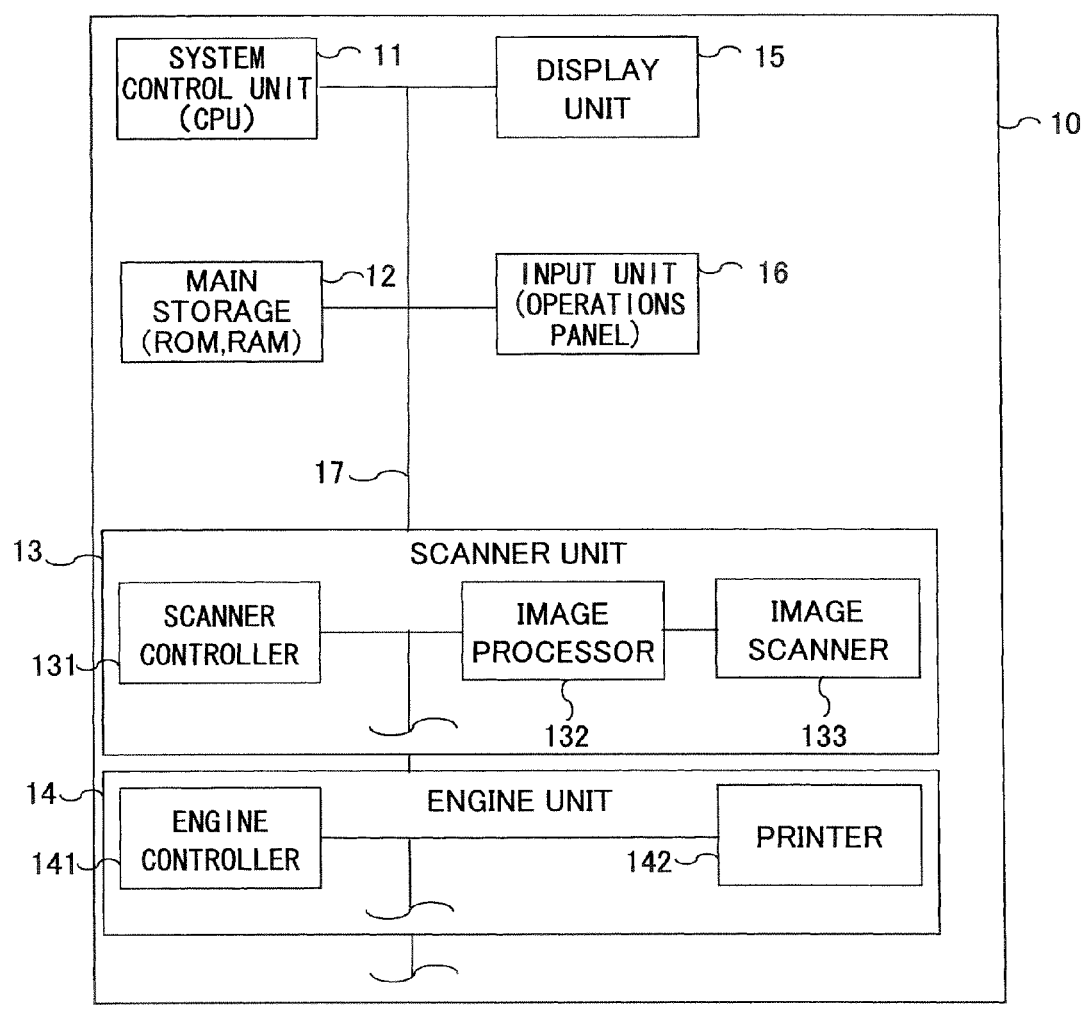
FIG. 1 is a block diagram of an image forming apparatus according to an embodiment of the present invention.

FIG. 1 is a block diagram of an image forming apparatus 10 according to an embodiment of the present invention.

As shown in FIG. 1, the image forming apparatus 10 includes a system control unit 11, a main storage 12, a scanner unit 13, an engine unit 14, a display unit 15, and an input unit 16.

The system control unit 11 includes a CPU (Central Processing Unit), and executes programs for realizing functions of the image forming apparatus 10 (e.g., copier, printer, fax). The system control unit 11 controls all operations of the image forming apparatus 10 via a CPU bus 17.

The main storage 12 includes a ROM (Read Only Memory), a RAM (Random Access Memory), and an NVRAM (Non-Volatile Random Access Memory). An image forming program to be executed by the system control unit 11 is stored in the ROM. When the system control unit 11 executes the image forming program, the image forming program stored in the ROM and data used for the image forming program are temporarily stored in the RAM (hereinafter, "memory"). Further, when performing electronic sort printing, image data of an original are temporarily stored in the memory. The NVRAM stores information that needs to be retained even after the power is turned off, such as information specific to the image forming apparatus 10 (e.g., the counter value of number of pages copied) and necessary setting values for controlling the copier, the printer, or the fax.

The scanner unit 13 is an image scanning device including a scanner controller 131, an image processor 132, and an image scanner 133. The scanner controller 131 controls the image scanner 133 and the image processor 132. The scanner unit 13 scans an original from an exposure glass or an ADF (Auto Document Feeder), obtains image data of the scanned original, and performs an optimum digital signal process on the image data obtained (e.g., input correction, zoom, spatial filter, density correction, gradation).

The engine unit 14 includes an engine controller 141 and a printer 142. The printer 142 includes paper feeding cassettes for storing paper used for printing of various sizes, a paper conveying unit for extracting paper from the paper feeding cassettes and conveying the paper to an image forming unit, the image forming unit for forming an image based on print information and printing the image on the paper, a paper discharge unit for discharging the paper on which the image is printed to a paper discharge tray, and a driving unit for driving the aforementioned units. The engine controller 141 controls the driving unit for printing images onto paper.

Accordingly, when the image forming apparatus 10 receives a request to perform electronic sort printing from a user, the scanner unit 13 scans an original, image data obtained by scanning the original are temporarily stored in the memory, and the engine unit 14 prints out the image data stored in the memory and produces the number of copies specified by the user.

Figure 2:
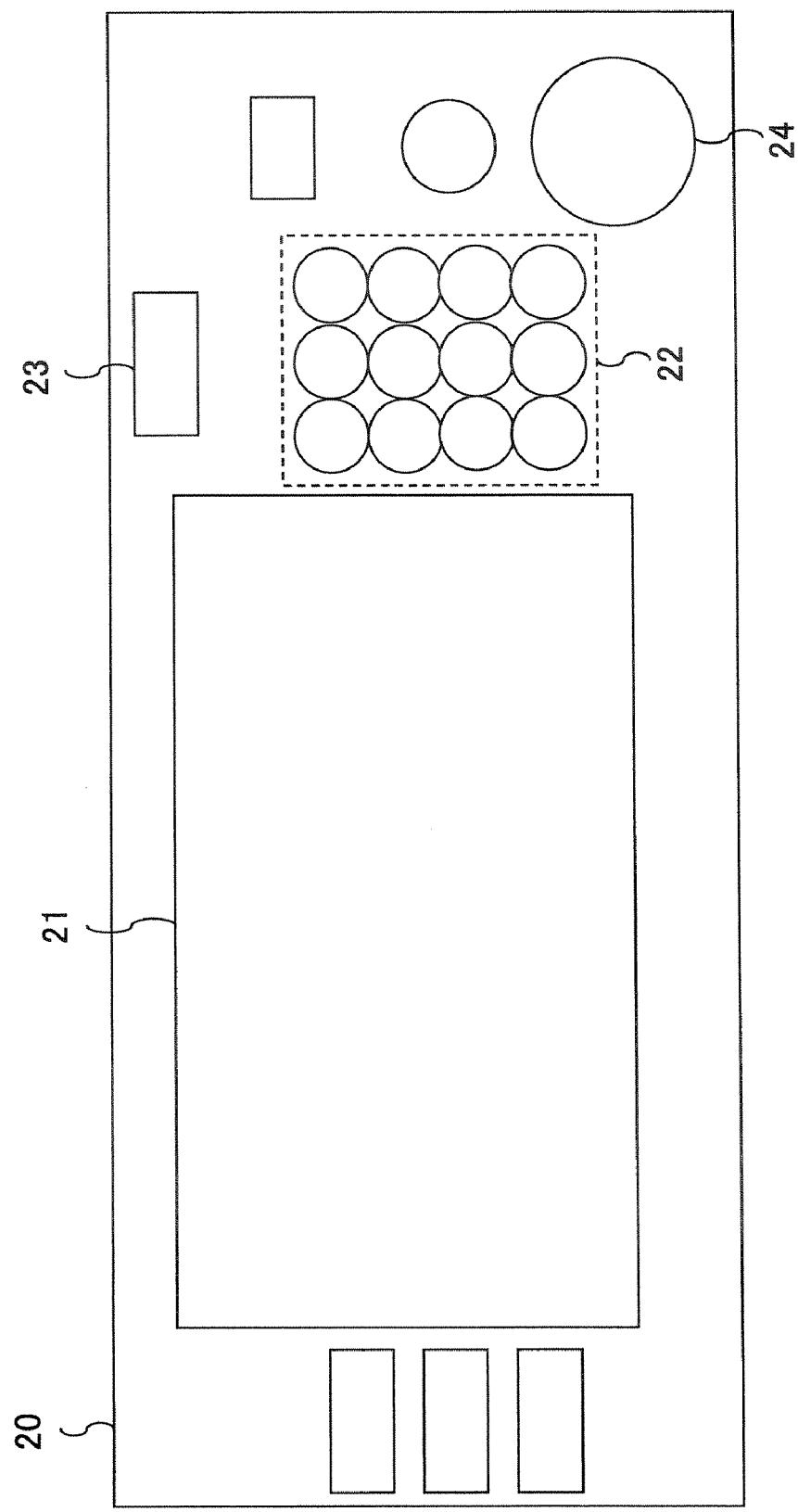
FIG. 2 is a schematic diagram of an operations panel according to an embodiment of the present invention.

FIG. 2 is a schematic diagram of an operations panel 20 according to an embodiment of the present invention. Relevant functions of the operations panel 20 used for performing electronic sort printing and specific operations of electronic sort printing are also described below.

The operations panel 20 includes a display screen 21, a numeric keypad 22, a reset key 23, and a start key 24.

Various types of information are displayed on the display screen 21 with character strings. Examples are information regarding a print job such as "printing"; operational conditions and input conditions of the image forming apparatus 10 such as perform/do not perform electronic sort printing; statuses of the apparatus such as "ready to copy", "reload paper in tray"; statuses of the electronic sort printing process to be reported to the user such as "sorting can be performed up to page XX"; and requests for obtaining instructions from the user such as "input number of pages of original", "continue scanning?". The display screen 21 is a liquid crystal touch panel. For example, when "continue scanning?" is displayed, the user can input an instruction to continue the process of scanning the original by touching an OK button on the liquid crystal touch panel with a touch pen provided as an accessory.

The numeric keypad 22 includes twelve hard keys, i.e., 0-9, *, and #. When it is necessary to input a number as one of the print conditions, the user can press a corresponding key to specify a number. When "input number of pages of original" is displayed on the display screen 21 when performing electronic sort printing, the user can press a corresponding key to specify the number of pages of the original.

By pressing the reset key 23, the user can cause the image forming apparatus 10 to cancel the present process. For example, while electronic sort printing is being performed, the user can press the reset key 23 to cancel the electronic sort printing.

When printing conditions, etc., have been input to the image forming apparatus 10, the user can press the start key 24 to cause the image forming apparatus 10 to start printing. When electronic sort printing is to be performed, the user places the original on the exposure glass or in the ADF, presses the start key 24, and the image forming apparatus 10 starts scanning the original and performs electronic sort printing.

The system control unit 11 controls the display unit 15 to display appropriate instructions on the display screen 21 of the operations panel 20 via the CPU bus 17 and an operations unit I/F.

The user can input print instructions from the operations panel 20 while confirming the status of the electronic sort printing being performed by the image forming apparatus 10.

Figure 3:
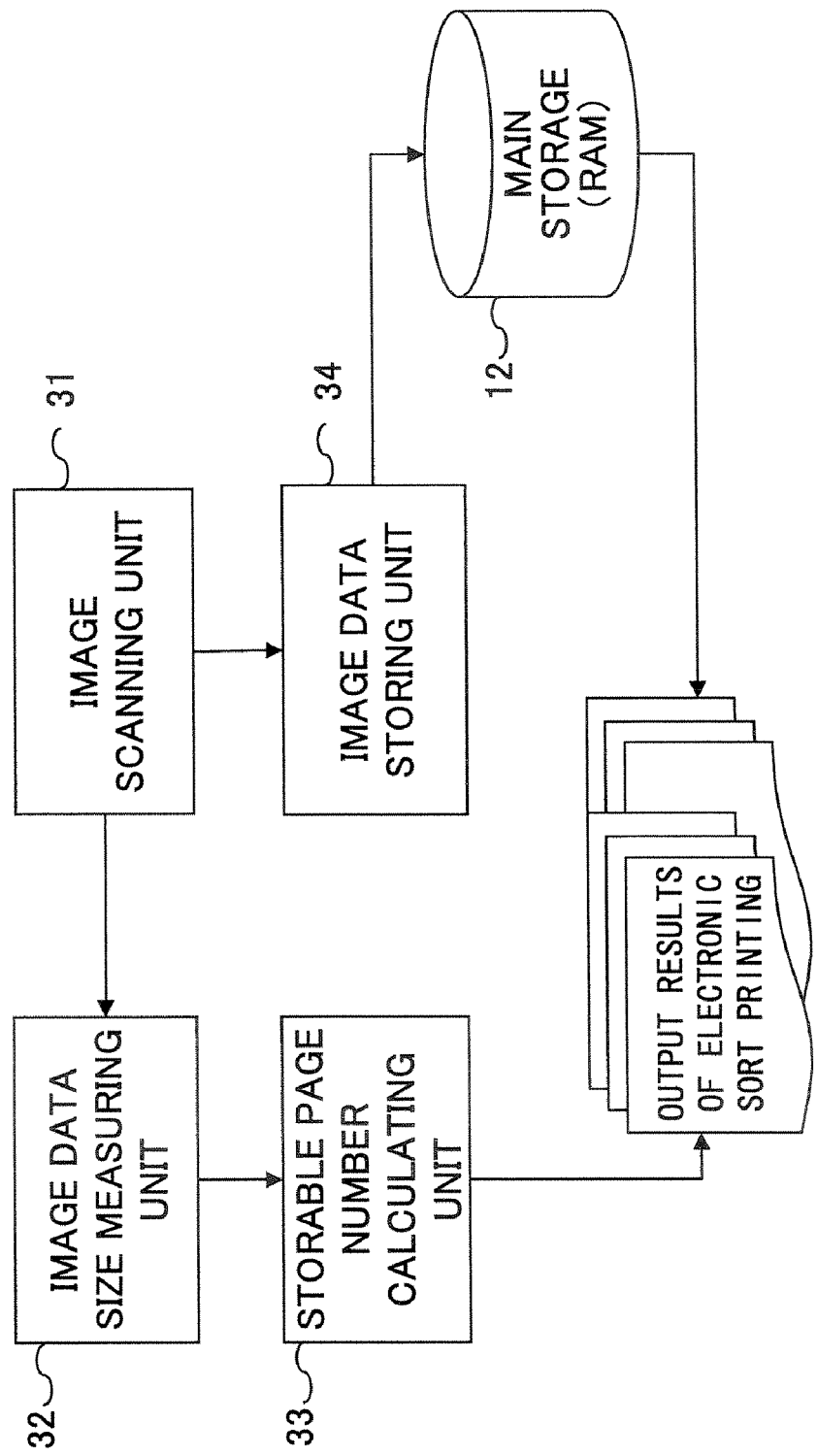
FIG. 3 is a functional block diagram of relevant parts of an embodiment of the present invention.

FIG. 3 is a functional block diagram of relevant parts of an embodiment of the present invention.

The functional configuration shown in FIG. 3 includes an image scanning unit 31, an image data size measuring unit 32, a storable page number calculating unit 33, and an image data storing unit 34.

The image scanning unit 31 scans a user's original with the scanner unit 13 provided in the image forming apparatus 10, and acquires image data of the original. The image scanning device used by the image scanning unit 31 includes the exposure glass, which is included in the minimum hardware of the image forming apparatus 10, and the ADF that automatically feeds the original.

The image scanning unit 31 scans the first page of an original placed on the exposure glass or in the ADF, and the image data size measuring unit 32 measures the size of image data corresponding to the scanned original. The size of the image data depends on the paper size of the original and conditions specified in the image forming apparatus 10 for scanning the original, such as the color mode ("color", "monochrome") and the resolution. The user can specify the conditions for scanning the original from the operations panel 20 before the image scanning unit 31 scans the original. When the user does not specify any conditions for scanning the original, setting values previously stored in the NVRAM, etc., of the image forming apparatus 10 are used.

The storable page number calculating unit 33 calculates the number of pages of the original that can be stored in the available space in the memory, when electronic sort printing is requested. The following equation (1) is used for the calculation, where the size (bytes/page) of the image data of the first page of the original measured by the image data size measuring unit 32 is S, and the available space (V bytes) in the memory is V.

$$P = V/S \qquad (1)$$

The storable number of pages is obtained by rounding off figures below the decimal point of a value obtained with equation (1). When electronic sort printing is requested, the storable number of pages calculated by the storable page number calculating unit 33 with equation (1) is used as a reference to determine whether all of the pages of the original can be printed at once, or the original needs to be divided into portions of less numbers of pages than the total number of pages.

The image data storing unit 34 temporarily stores, in the memory (main storage 12), the image data of the original scanned by the image scanning unit 31, when electronic sort printing is requested. The image data stored in the memory are stored as a raster image (also referred to as raster graphics) formed by aligning colored dots. The image forming apparatus 10 prints out the image data stored in the memory to produce a specified number of copies. The system control unit 11 stores the image data in the memory via the CPU bus 17.

The flow of the electronic sort printing is described below.

When a user sets an original on the exposure glass or in the ADF, and the image forming apparatus 10 receives an instruction to perform electronic sort printing from the user, the image scanning unit 31 scans the first page of the original.

Next, the image data size measuring unit 32 measures the size of the image data obtained by scanning the first page. The storable page number calculating unit 33 calculates the number of pages that can be stored in the available space in the memory by using equation (1). Based on the calculated number, it is determined whether all pages of the original can be electronic sort printed at once, or whether the original needs to be divided into portions of fewer pages. The determination result is reported to the user via the operations panel 20.

Next, even when the data size of all pages of the original is larger than the available space in the memory, the user can instruct the image forming apparatus 10 to continue the operation of the electronic sort printing. When this instruction is received, the image scanning unit 31 scans the number of pages of the original that can be stored in the memory, and the image data storing unit 34 temporarily stores the resulting image data in the memory.

Next, electronic sort printing starts by using the image data stored in the memory. When printing ends, the image data no longer need to be stored in the memory, and are thus deleted. Then, the next image data of the original are stored in the available space in the memory, which space is made available by deleting the previous image data.

Electronic sort printing is continued by repeating this process until there are no more pages of the original to be scanned.

The following is a description of processes for performing electronic sort printing for all pages of an original, even when the data size of all pages of the original is larger than the available space in the memory.

Figure 4:
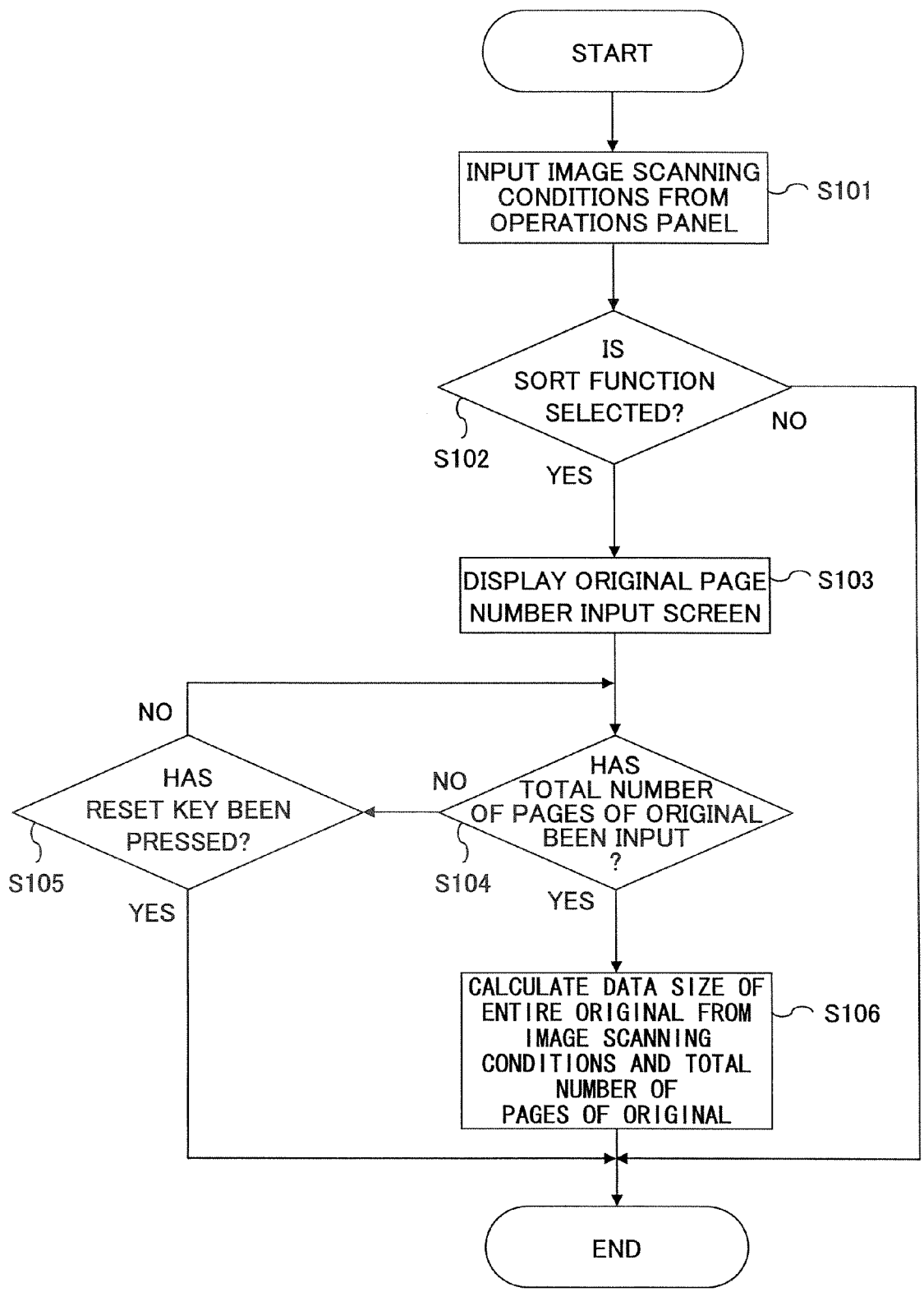
FIG. 4 is a flowchart of a process of setting the number of pages of an original and image scanning conditions according to an embodiment of the present invention.

FIG. 4 is a flowchart of a process of setting the number of pages of an original and image scanning conditions according to an embodiment of the present invention.

The process illustrated in FIG. 4 is performed before a user instructs to perform electronic sort printing (before placing an original on the exposure glass or in the ADF). The user is prompted to specify, from the display screen 21, image scanning conditions (paper size, color mode, resolution, etc.) and the number of pages of an original to be electronic sort printed, so as to calculate an estimated data size of all pages of the original. This is to compare the estimated data size of all pages of the original, which data size is calculated based on the image scanning conditions and the number of pages of the original, with the available space in the memory, and determine whether the original can be printed all at once by the image forming apparatus 10 (confirmation process).

First, the user specifies image scanning conditions for performing electronic source printing with the display screen 21 of the operations panel 20 (step S101). However, image scanning conditions of the image forming apparatus 10 do not necessarily have to be specified; when the user does not specify any conditions, setting values previously stored in the image forming apparatus 10 are used.

Next, the user presses an ON button for electronic sort printing displayed on the display screen 21 of the operations panel 20, to instruct starting electronic sort printing (step S102).

When the ON button for electronic sort printing displayed on the operations panel 20 is not pressed, or when an OFF button is pressed (No in step S102), it is determined that the confirmation process performed before electronic sort printing is not to be performed, and the process ends.

Figure 5:
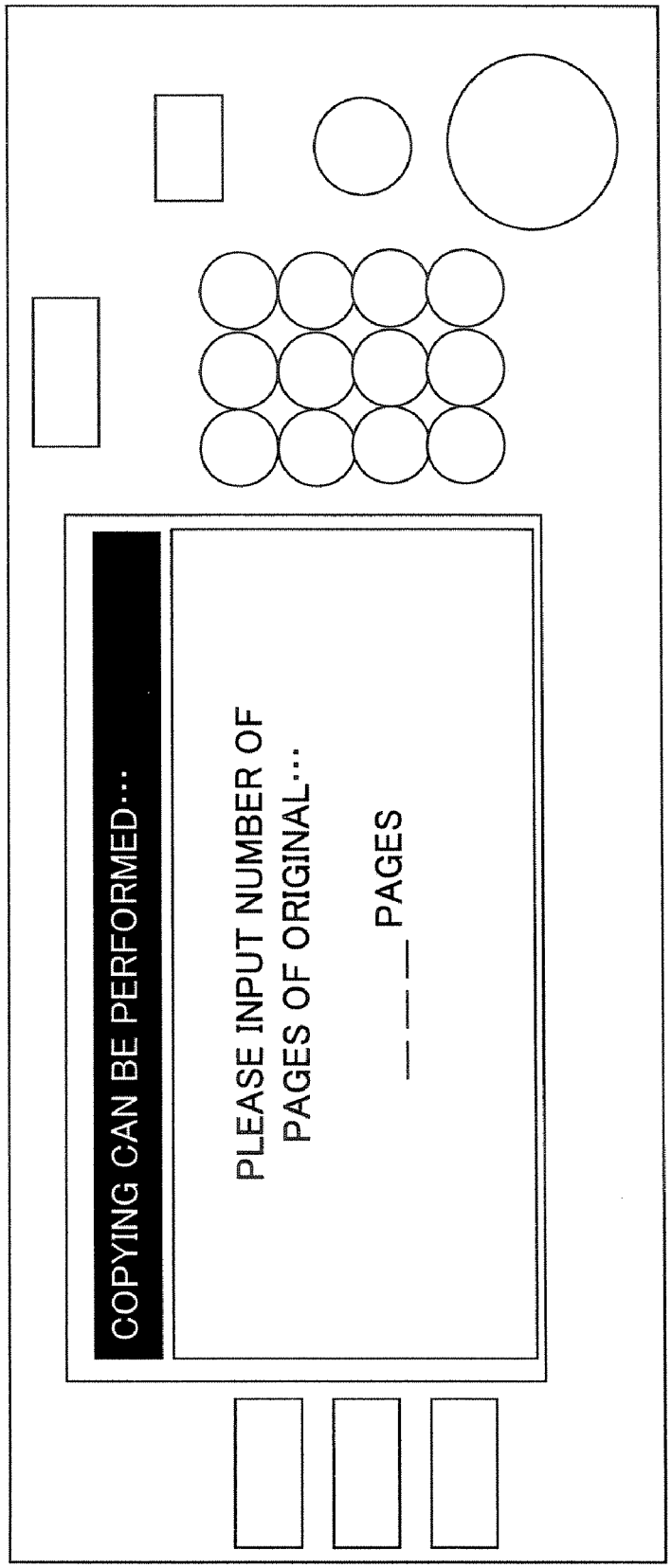
FIG. 5 is an original page number input screen according to an embodiment of the present invention.

When the user presses the ON button for starting electronic sort printing (Yes in step S102), the display unit 15 of the image forming apparatus 10 receives an instruction to display an original page number input screen shown in FIG. 5 (step S103).

Next, it is determined whether the user has input the number of pages of the original with the numeric keypad 22 of the operations panel 20 (step S104).

When it cannot be confirmed that the number of pages of the original has been input with the numeric keypad 22 of the operations panel 20 (No in step S104), the status of the reset key 23 of the operations panel 20 is checked (step S105).

When the user has not pressed the reset key 23 (No in step S105), the display unit 15 continues to display the original page number input screen on the display screen 21 of the operations panel 20 to wait for the user's input.

When the user has pressed the reset key 23 (Yes in step S105), it is determined that the confirmation process to be performed before performing electronic sort printing has been cancelled. Accordingly, the display unit 15 of the image forming apparatus 10 receives an instruction to switch the original page number input screen to a print job standby screen, and the process ends.

When the user has input the number of pages of the original with the numeric keypad 22 of the operations panel 20 (Yes in step S104), the estimated data size of all pages of the original is calculated from image data corresponding to one page (estimated from the image scanning conditions) and the number of pages of the original input by the user (step S106).

Based on the estimated data size of all pages of the original calculated by the process shown in FIG. 4, the user can easily know whether the original can be electronic sort printed all at once, before instructing the start of electronic sort printing.

When the ADF cannot be provided in the image forming apparatus 10, the user needs to place one page at a time on the exposure glass. In a case where the image forming apparatus 10 is controlled not to perform the process required for executing the electronic sort printing for all pages of the original, the following problem may occur. That is, if the user makes the image forming apparatus 10 scan all pages via the exposure glass and instructs the start of electronic sort printing without knowing that the data size of all pages of the original exceeds the available space in the memory, the electronic sort printing stops before all pages are printed. Accordingly, the user's time and effort are wasted. The workload on the user can be reduced if the user can confirm whether all pages of the original can be electronic sort printed before placing pages of the original on the exposure glass.

Step S104 of FIG. 4 does not necessarily have to be performed. As a variation, the ADF can automatically count the number of pages of the original.

Figure 6:
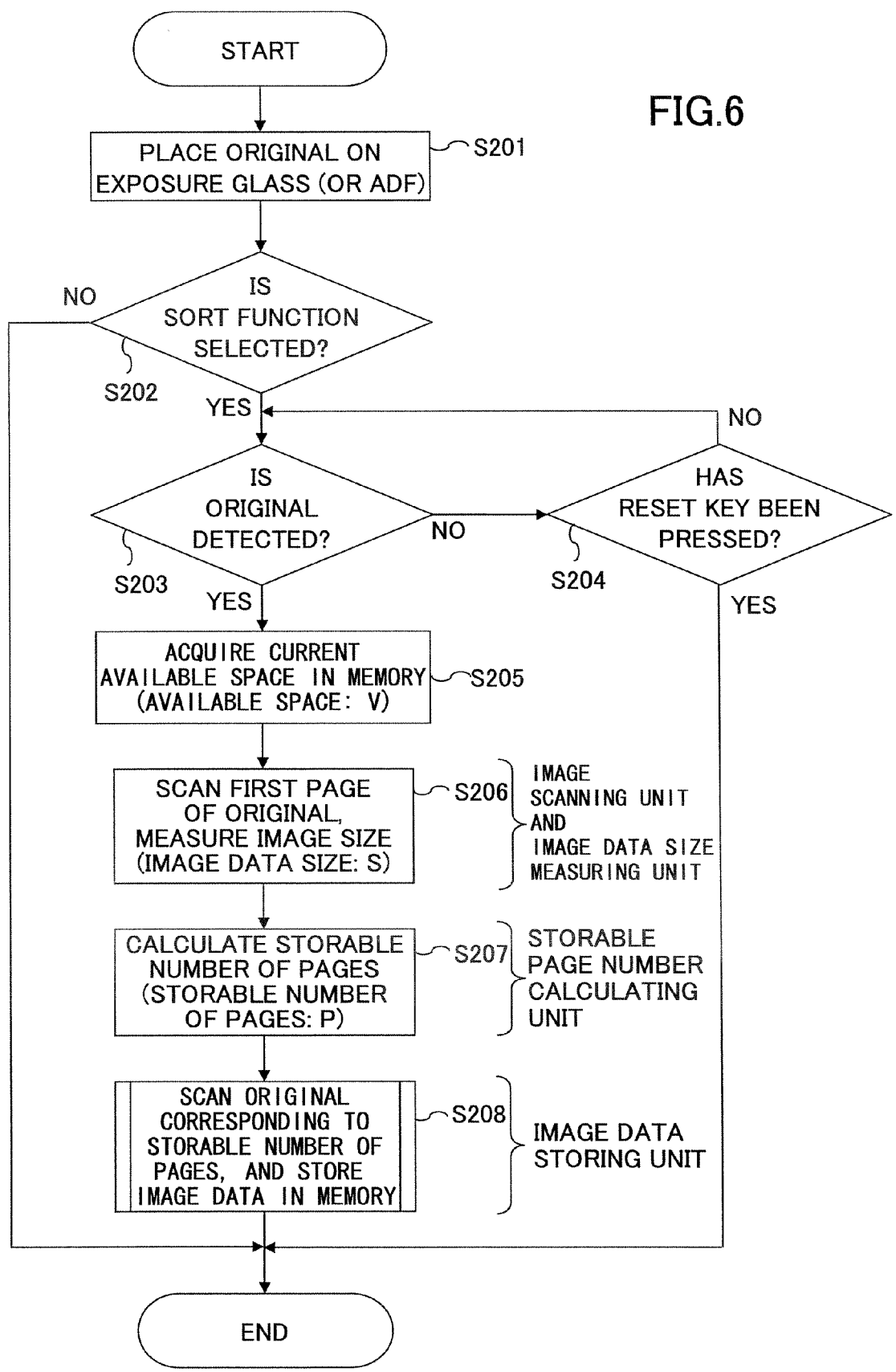
FIG. 6 is a flowchart of a process performed before storing in a memory image data to be electronic sort printed according to an embodiment of the present invention.

FIG. 6 is a flowchart of a process performed before storing in the memory the image data to be electronic sort printed according to an embodiment of the present invention.

In FIG. 6, it is indicated whether the image scanning unit 31, the image data size measuring unit 32, the storable page number calculating unit 33, and the image data storing unit 34 are operating in the flow of electronic sort printing.

In the process shown in FIG. 6, it is assumed that the image forming apparatus 10 includes the ADF. An original placed in the ADF is automatically detected and the process starts automatically. In the case of the exposure glass, the user needs to press the start key 24 of the operations panel 20 to start the process. Therefore, when using the exposure glass, the process of automatically detecting the original is replaced by pressing the start key 24.

First, a user places the original in the ADF provided on the image forming apparatus 10 (step S201).

Next, it is confirmed whether the user has given an instruction to perform electronic sort printing by pressing the ON button for electronic sort printing with the display screen 21 of the operations panel 20 (step S202). As described with reference to FIG. 4, before electronic sort printing is performed (before the original is placed in the ADF), the user specifies image scanning conditions (paper size, color mode, resolution, etc.).

When the user has not instructed to perform electronic sort printing (No in step S202), it is determined that the user who placed the original in the ADF has no intention of performing electronic sort printing, and the process ends.

When the user has instructed to perform electronic sort printing (Yes in step S202), and the original is placed in the ADF, the ADF automatically detects that the original is placed in the ADF. It is determined whether the original is placed in the ADF based on this detection result (step S203).

When the original is not properly placed in the ADF (No in step S203), the user is notified to that effect by a message displayed on the display screen 21 of the operations panel 20, and the image forming apparatus 10 waits for the user to properly place the original in the ADF. Meanwhile, it is determined whether the reset key 23 of the operations panel 20 has been pressed (step S204).

When the reset key 23 of the operations panel 20 has not been pressed (No in step S204), and the original is not properly placed, the image forming apparatus 10 continues to wait for the original to be properly placed and monitors whether the reset key 23 of the operations panel 20 has been pressed.

When the reset key 23 of the operations panel 20 has been pressed (Yes in step S204), it is determined that the user has cancelled the electronic sort printing, and the process ends.

When the original is properly placed from the beginning, or when the user corrects the position of the original (Yes in step S203), a main system of the image forming apparatus 10 is activated. When a copy application starts up, the available space in the allocated memory area is acquired (step S205).

The image scanning unit 31 scans the first page of the original placed in the ADF, and the image data size measuring unit 32 measures the size of the image data of the first page of the original (step S206).

The storable page number calculating unit 33 calculates the storable number of pages based on the available space in the memory and the image data size measured by the image data size measuring unit 32 (step S207).

Next, the image scanning unit 31 scans the storable number of pages of the original calculated by the storable page number calculating unit 33, and the image data storing unit 34 stores the image data obtained by scanning the original in the available space in the memory. When printing ends, the image data no longer need to be stored in the memory, and are thus deleted. Then, the next image data of the original is stored in the available space in the memory, which space is made available by deleting the previous image data. This process is repeated until all pages of the original are printed (step S208).

Details of the image data storing unit 34 are described with reference to FIG. 7.

Figure 7:
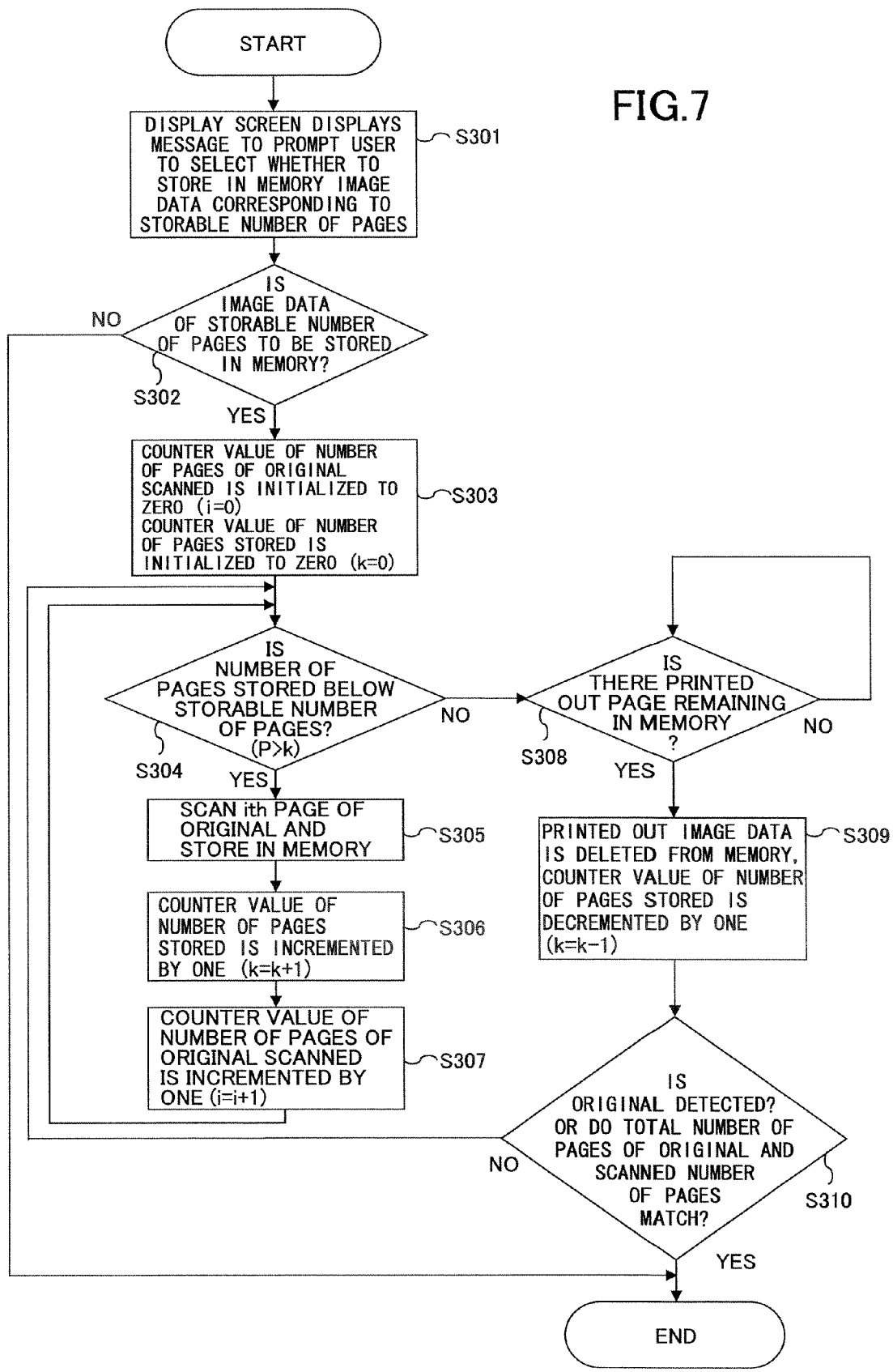
FIG. 7 is a flowchart of a process of storing and deleting image data in the memory according to an embodiment of the present invention.

FIG. 7 is a flowchart of a process of storing and deleting image data in the memory according to an embodiment of the present invention. This process is performed in step S208 in FIG. 6. In the process shown in FIG. 7, it is assumed that the image forming apparatus 10 includes the ADF. An original placed in the ADF is automatically detected and it is automatically determined whether all pages of the original have been scanned. In the case of the exposure glass, it is determined whether all pages of the original have been scanned based on whether the user presses the start key 24 of the operations panel 20. Therefore, when the exposure glass is used, the process of automatically detecting the original is replaced by pressing the start key 24.

The display screen 21 of the operations panel 20 receives an instruction to display a message to prompt the user to select whether to store, in the memory, image data corresponding to the storable number of pages calculated by the storable page number calculating unit 33 (step S301).

Next, it is determined whether the user has selected to store the image data in the memory (step S302).

When the user has selected not to store the image data (No in step S302), it is determined that the user has cancelled the electronic sort printing. Accordingly, the display unit 15 of the image forming apparatus 10 receives an instruction to switch the original page number input screen to the print job standby screen, and the process ends.

When the user has selected to store the image data (Yes in step S302), values of counter for counting the number of pages stored in the memory and a counter for counting the number of pages of the original scanned are initialized to zero (step S303).

The storable number of pages calculated by the storable page number calculating unit 33 and the counter value of the number of pages stored (number of image data items) are compared to determine whether the number of pages stored is less than the storable number of pages (step S304).

When the number of pages stored is less than the storable number of pages (Yes in step S304), the image scanning unit 31 scans one page ($i^{th}$ page) of the original, and image data obtained by scanning one page of the original are stored in the available space in the memory (step S305).

Next, the counter value of the number of pages stored is incremented by one (step S306).

Next, the counter value of the number of pages of the original scanned is also incremented by one (step S307).

While the number of pages stored is below the storable number of pages, the image forming apparatus 10 repeats the process of scanning a page of the original and storing the corresponding image data in the memory.

When the number of pages stored becomes greater than or equal to the storable number of pages as a result of repeating the process of storing image data in the memory (No in step S304), it is determined whether image data that have been printed and no longer need to be stored in the memory are still remaining in the memory (step S308).

When there is no unnecessary image data remaining in the memory (No in step S308), the status of the memory is periodically monitored until printing is done and space becomes available in the memory.

When there are unnecessary image data remaining in the memory (Yes in step S308), the unnecessary image data corresponding to one page are deleted from the memory, and the counter value of the number of pages stored is decremented by one (step S309). When the ADF is being used, the ADF automatically scans the original. When the exposure glass is used, a message to prompt the user to place the original on the exposure glass is displayed on the display screen 21 of the operations panel 20. When the original is placed on the exposure glass and the user presses the start key 24 of the operations panel 20, the original is scanned.

It is determined whether the image scanning unit 31 has scanned all pages of the original based on results of the automatic detection performed by the ADS (step S310). As described with reference to FIG. 4, if the user has input the number of pages of the original with the operations panel 20 in the process of confirming whether all pages of the original can be printed at once before instructing the start of electronic sort printing, it is determined whether all pages of the original have been scanned based on the input number of pages.

When all pages of the original have not yet been scanned (No in step S310), the image scanning unit 31 scans the next page of the original. The printed image data are deleted from the memory and image data obtained by scanning the next page are stored in the space made available in the memory.

When all pages of the original have been scanned (Yes in step S310), the image data stored in the memory are printed, and the process ends.

The image scanning unit 31 scans the storable number of pages of the original calculated by the storable page number calculating unit 33. The image data storing unit 34 obtains image data from the scanned original and stores the image data in the available space in the memory.

Next, when the stored image data are printed, the image scanning unit 31 scans the next set of storable number of pages of the original. Image data that have been printed and no longer need to be stored in the memory are deleted so that new image data can be stored in the space made available in the memory.

This process is repeated until all pages of the original have been scanned. Accordingly, electronic sort printing can be performed for all pages of the original.

In the above description, the method of deleting printed image data from the memory and storing new image data in the space made available is performed for one page at a time. As a variation of this method, image data corresponding to the storable number of pages can be collectively deleted and stored.

Figure 8:
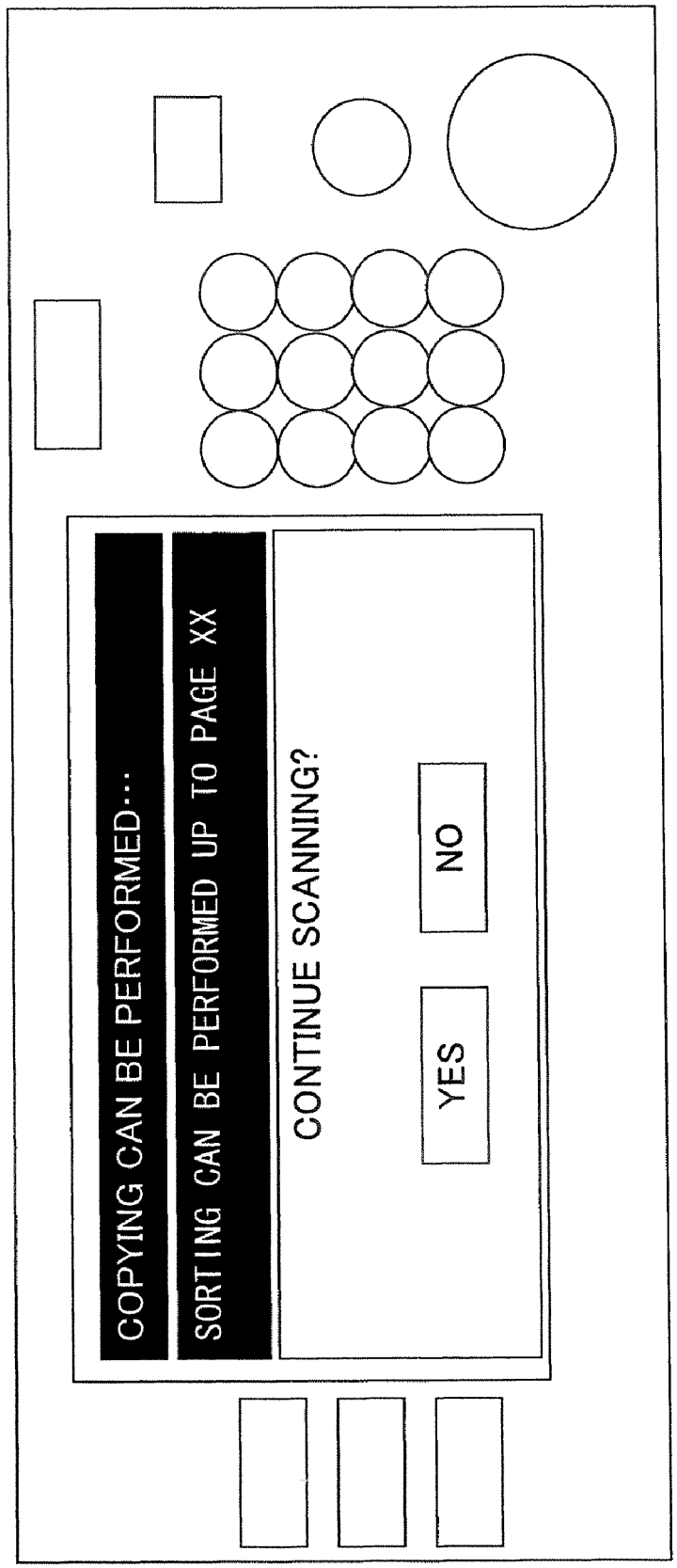
FIG. 8 is an example screen displayed on the operations panel.

FIG. 8 is an example screen 1 displayed on the operations panel 20 when the process shown in FIG. 7 is being performed.

The example screen 1 shown in FIG. 8 displays on the operations panel 20 the storable number of pages of the original after step S207 in FIG. 6 is performed (after the storable page number calculating unit 33 calculates the storable number of pages), and prompts the user to select whether the subsequent process shown in FIG. 7 (step S208 in FIG. 6) is to be performed.

Accordingly, it is possible to cancel electronic sort printing before storing image data in the memory.

However, when the user selects to perform the process shown in FIG. 7, the user needs to take the trouble of retrieving the page of the original used for the calculation performed by the storable page number calculating unit 33, and putting it back on the top of the originals placed in the ADF.

Thus, the following variation is possible. That is, when performing step S206 in FIG. 6, the image data scanned by the image scanning unit 31 can be measured by the image data size measuring unit 32 and also stored in the memory by the image data storing unit 34.

Accordingly, processes of the image scanning unit 31 and the image data storing unit 34 can both be performed in one step to enhance efficiency. Further, the user is spared the trouble of retrieving the page of the original used for the calculation of the storable number of pages, and putting it back on the top of the originals placed in the ADF.

Figure 9:
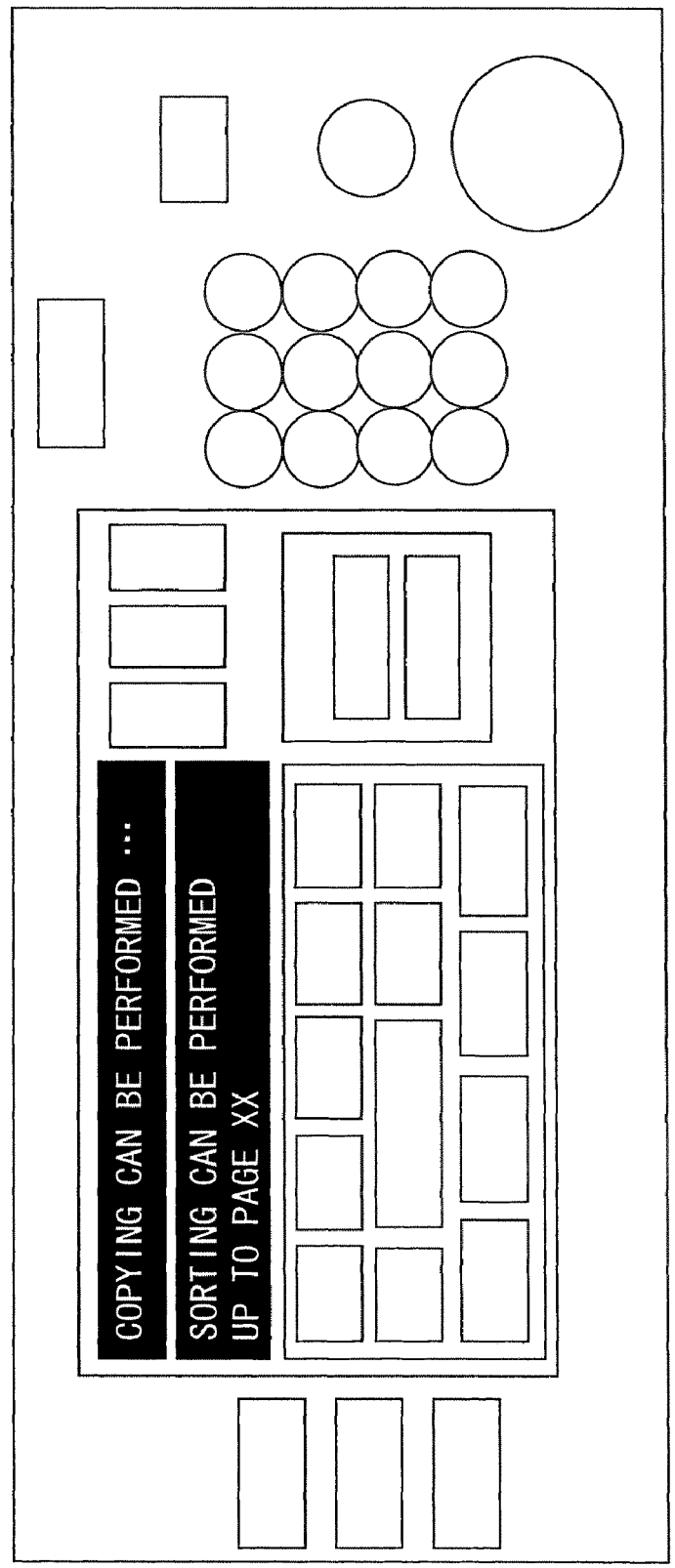
FIG. 9 is another example screen displayed on the operations panel.

FIG. 9 is another example screen 2 displayed on the operations panel 20 when the process shown in FIG. 7 is being performed.

The example screen 2 shown in FIG. 9 displays on the operations panel 20 the storable number of pages of the original after step S207 in FIG. 6 is performed (after the storable page number calculating unit 33 calculates the storable number of pages). The example screen 2 indicates that the electronic sort printing is automatically being performed.

It is possible to control the image forming apparatus 10 to perform or not perform the process required for executing the electronic sort printing when the data size of all pages of the original is larger than the available space in the memory. Specifically, among the setting values for the functions in the image forming apparatus 10, there is a setting value for determining whether to perform the process required for executing the electronic sort printing. If this setting value indicates "perform process", this process is performed. If this setting value indicates "do not perform process", this process is not performed; all pages of the original are scanned, but when the data size of all pages of the original is larger than the available space in the memory, the memory becomes full before storing all of the pages, and the pages are therefore not printed.

Even when the data size of all pages of the original is larger than the available space in the memory, the user can confirm with the operations panel 20 of the image forming apparatus 10 whether the image forming apparatus 10 is set to perform the process required for executing the electronic sort printing, and the user can also change this setting.

According to an embodiment of the present invention, when a user places an original on an exposure glass or in an ADF and the image forming apparatus 10 receives an instruction to perform electronic sort printing, the image scanning unit 31 scans the first page of the original, the image data size measuring unit 32 measures the size of the image data obtained by scanning the original, and the storable page number calculating unit 33 calculates the number of storable pages that can be stored in the available space in the memory based on the available space in the memory and the value measured by the image data size measuring unit 32 (size of the image data of the first page of the original). Based on the calculation results, it is determined whether all pages of the original can be electronic sort printed at once or whether the original needs to be divided into portions of fewer pages. The image scanning unit 31 scans the storable number of pages of the original, the image data storing unit 34 stores the corresponding image data in the memory, and electronic sort printing starts based on the stored image data. By repeating the process of deleting from the memory image data that have been printed and no longer need to be stored in the memory and storing new image data in the space made available, electronic sort printing can be performed even when the data size of all pages of the original is larger than the available space in the memory.

According to one embodiment of the present invention, it is possible to perform electronic sort printing for all pages of an original at once or by plural portions, even when the total data size of the original exceeds the available space in a memory.

Further, according to one embodiment of the present invention, efficiency of electronic sort printing is enhanced, and the user's workload is reduced.

Further, according to one embodiment of the present invention, the user can cancel electronic sort printing before image data of the original are stored in the memory.

Further, according to one embodiment of the present invention, the user can know, before the electronic sort printing is actually performed, whether all pages of an original can be electronic sort printed at once, or whether the original needs to be divided into portions of fewer pages.

Further, according to one embodiment of the present invention, when the original needs to be divided into portions of fewer pages to perform the electronic sort printing, the user can know how many pages each portion can include.

The present invention is not limited to the specifically disclosed embodiment, and variations and modifications may be made without departing from the scope of the present invention.

The present application is based on Japanese Priority Patent Application No. 2006-038540, filed on Feb. 15, 2006, the entire contents of which are hereby incorporated by reference.

What is claimed is:

1. An image forming apparatus, comprising:
an image scanning unit configured to scan an original and obtain image data of the original;
an image data size measuring unit configured to measure a data size of the image data corresponding to one page of the original scanned by the image scanning unit;
an image data storing unit configured to store in a memory the image data obtained by the image scanning unit;
a storable page number calculating unit configured to calculate a storable number of pages of the original that can be stored in the memory based on the data size measured by the image data size measuring unit and available space in the memory;
an automatic document feeder; and
an operations panel, wherein
in response to the storable number of pages calculated by the storable page number calculating unit being less than a total number of pages of the original, the image data of the original is successively stored in and deleted from the memory; and
in response to the automatic document feeder detecting that the original is placed therein, the operations panel displays the storable number of pages calculated by the storable page number calculating unit before sort printing is executed.

2. The image forming apparatus according to claim 1, wherein
the image data storing unit stores the image data obtained by the image scanning unit in the memory at the same time as the image data size measuring unit measures the data size of the image data.

3. The image forming apparatus according to claim 1, wherein
the image data size measuring unit measures the data size of the image data obtained by the image scanning unit before the image data are stored in the memory, and
in response to a user-specified instruction, the image data storing unit stores the image data in the memory.

4. The image forming apparatus according to claim 1, further comprising:
an image scanning condition setting unit configured to receive the total number of pages of the original and/or image scanning conditions input by a user.

5. The image forming apparatus according to claim 1, wherein
the operations panel is configured to receive a user-specified instruction as to whether sort printing is to be continued.

6. The image forming apparatus according to claim 1, wherein
the operations panel is configured to receive a user-specified instruction as to whether the image data of the original is to be successively stored in and deleted from the memory in response to the total number of pages of the original exceeding the available space in the memory.

7. A non-transitory computer readable medium storing a program that causes a computer to execute a procedure for forming an image, the procedure comprising the steps of:
(a) scanning an original and obtaining image data of the original;
(b) measuring a data size of the image data corresponding to one page of the original scanned at step (a);
(c) storing in a memory the image data obtained at step (a);
(d) deleting the image data stored in the memory at step (c); and
(e) calculating a storable number of pages of the original that can be stored in the memory based on the data size measured at step (b) and available space in the memory, wherein
in response to the storable number of pages calculated at step (e) being less than a total number of pages of the original, step (c) and step (d) are repeated; and
in response to an automatic document feeder detecting that the original is placed therein, an operations panel displays the storable number of pages calculated in the calculating step before sort printing is executed.

* * * * *